United States Patent [19]
Mangen et al.

[11] Patent Number: 5,099,955
[45] Date of Patent: Mar. 31, 1992

[54] LUBRICATION SYSTEM FOR AN AGRICULTURAL IMPLEMENT

[75] Inventors: Lyle P. Mangen, Wausau, Wis.; Jesse H. Orsborn, Hinsdale; Kevin S. Richman, Darien, both of Ill.

[73] Assignee: J. I. Case Company, Racine, Wis.

[21] Appl. No.: 624,880

[22] Filed: Dec. 5, 1990

[51] Int. Cl.$^5$ ............................................. F16N 27/00
[52] U.S. Cl. ........................................ 184/7.4; 184/6; 184/105.1; 60/456; 56/12.3
[58] Field of Search ............... 184/7.3, 7.4, 6.4, 105.1, 184/6; 60/456; 56/11.9, 28, 41, 50, 12.1, 12.3

[56] References Cited

U.S. PATENT DOCUMENTS

| | | | |
|---|---|---|---|
| 2,232,428 | 2/1941 | Benedek | 60/456 |
| 2,232,620 | 2/1941 | Meeks | 60/456 |
| 2,961,829 | 11/1960 | Weisenbach | 60/456 |
| 3,729,910 | 5/1973 | Hardee | 56/11.9 |
| 4,531,368 | 7/1985 | Killen | 60/456 |
| 4,769,978 | 9/1988 | Reichen et al. | 56/12.3 |

FOREIGN PATENT DOCUMENTS 0682167 8/1979 U.S.S.R. ............................. 56/11.9

Primary Examiner—Ira S. Lazarus
Assistant Examiner—Alan B. Cariaso
Attorney, Agent, or Firm—Dressler, Goldsmith, Shore, Sutker & Milnamow, Ltd.

[57] ABSTRACT

A lubrication system including a lubricant reservoir connected to a pump assembly which selectively operates in either of two modes of operation. In one mode of operation, the pump assembly provides pressurized lubricant to various lubricant receiving areas. In a second mode of operation, the same pump assembly is used to refill the lubricant reservoir from a lubricant supply source.

10 Claims, 2 Drawing Sheets

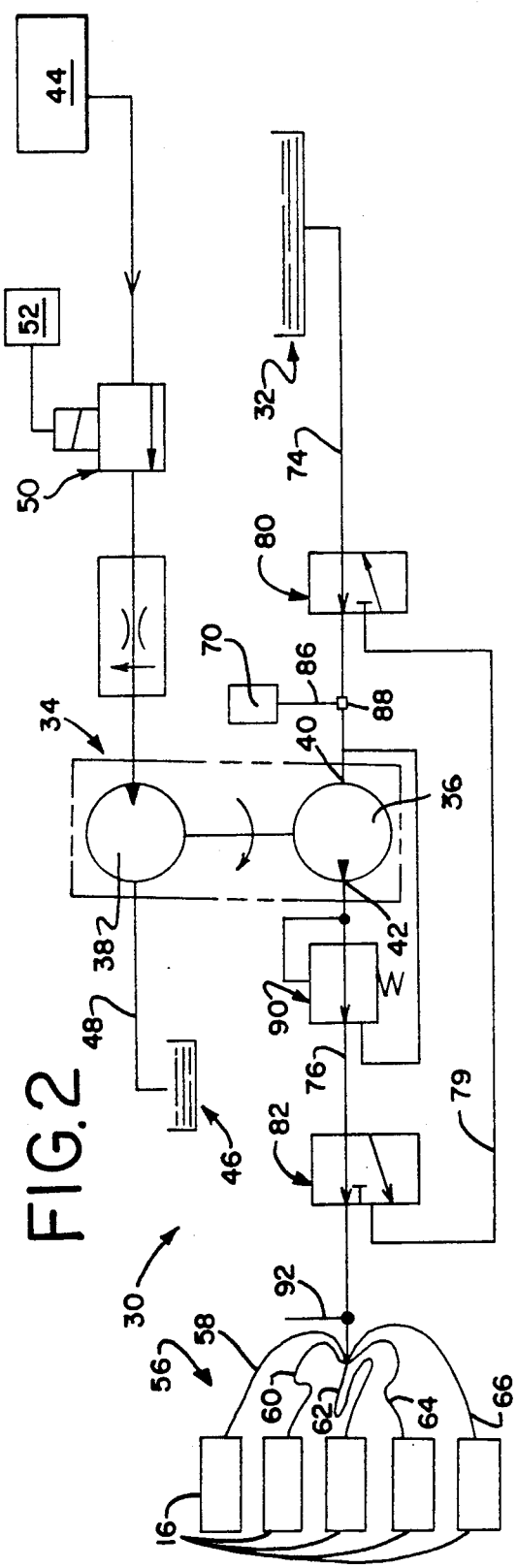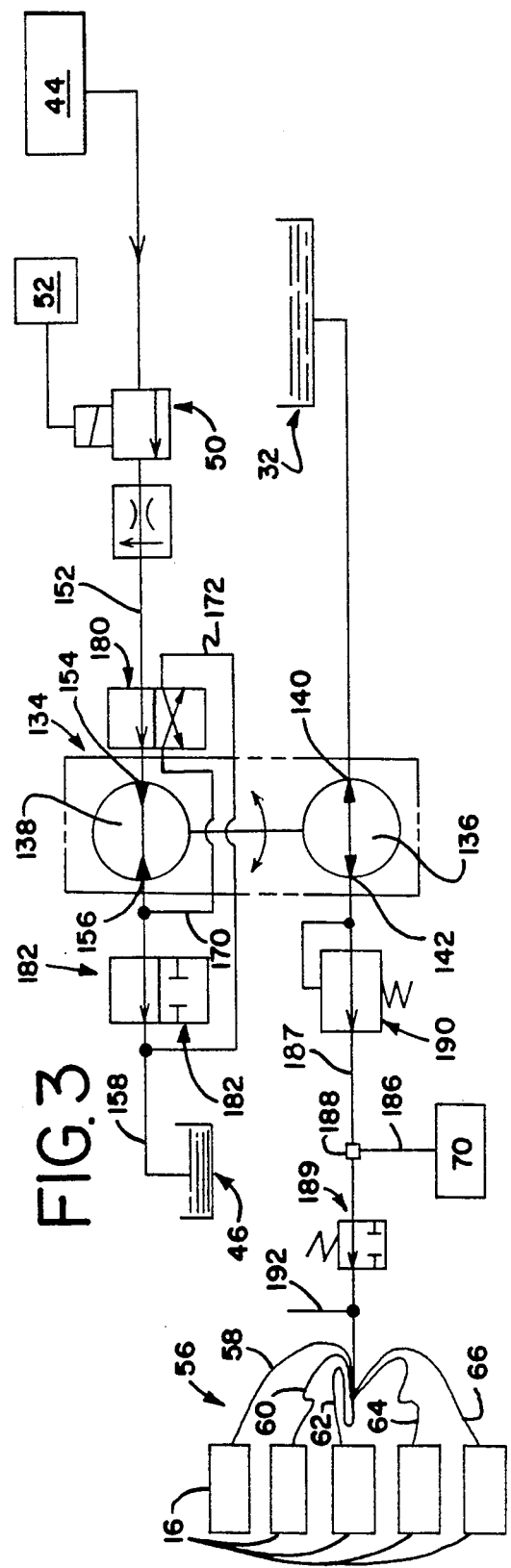

LUBRICATION SYSTEM FOR AN AGRICULTURAL IMPLEMENT

FIELD OF THE INVENTION

The present invention generally relates to agricultural implements and, more particularly, to an improved lubrication system having a pump mechanism which is selectively operable to lubricate the implement or to refill a lubricant reservoir located on the implement.

BACKGROUND OF THE INVENTION

Agricultural implements such as tractors, combines and cotton harvesters include various rotatably driven mechanisms for operating different implement components. Proper lubrication of such mechanisms facilitate their operation by reducing failure resulting from friction and wear of the component parts thereof.

A typical cotton harvester includes a plurality of harvesting units Each harvesting unit has a rotatable harvesting mechanism arranged in combination therewith. Between 20 and 30 individual grease or lubricant fittings are typically provided on each harvesting unit. Each grease fitting must be located and lubricated with a proper amount of lubricant on a daily basis during the harvesting season. Extensive time is spent, therefore, providing proper lubrication of the various mechanisms on the agricultural implement. As will be appreciated, time is of premium concern during the harvesting season.

Various approaches have been proposed to reduce the time and effort required to lubricate or grease the various operational mechanisms of the agricultural implement. Such proposals typically involve a metering pump whose inlet is connected to a grease or lubricant reservoir on the agricultural implement. The pump withdraws lubricant from a reservoir and supplies pressurized lubricant from an outlet end thereof to various operable mechanisms on the implement. Unlike some other lubrication systems, the grease provided to the operational mechanisms on the agricultural implements is lost during operation of the implement and is not returned to the lubricant reservoir. Accordingly, after repeated lubrication procedures, the grease or lubricant in the reservoir is consumed and the lubricant reservoir must be refilled.

To refill or charge the grease reservoir, a truck having a supply barrel filled with lubricant is positioned proximate to the agricultural implement. An ancillary or separate grease pump on the refill truck is operated to withdraw grease from the supply source in a manner refilling the lubricant reservoir on the agricultural implement. The redundant provision of a lubricant pump on the agricultural implement and a lubricant pump on the refill truck adds to the overall operational costs of the agricultural implement and adds complexity to a relatively simple lubrication system.

BRIEF DESCRIPTION OF THE PRESENT INVENTION

In view of the above, and in accordance with the present invention, there is provided an improved lubrication system for an agricultural implement. The improved lubrication system includes a lubricant or grease reservoir located on the agricultural implement and a source of pressurized lubricant such as a pump assembly which is likewise located on the agricultural implement. Unlike other systems, the pump assembly of the present invention has a dual function. In one mode of operation, the pump assembly provides pressurized lubricant to various lubricant receiving areas on the implement. In a second mode of operation, the same pump assembly directs lubricant from a lubricant supply source to the lubricant reservoir in a manner refilling the lubricant reservoir. To effect such ends, the lubrication system includes hydraulic circuitry arranged in combination with the pump assembly.

The pump assembly of the present invention includes a gear pump driven by a hydraulic motor. An inlet to the gear pump is connected to the lubricant reservoir and the gear pump provides a relatively constant supply of pressurized lubricant at an outlet thereof. The hydraulic motor is connected to a pressurized hydraulic system on the implement. A selectively operated valve mechanism controls fluid flow to the hydraulic motor and, thereby, controls operation of the pump assembly.

In one form of the invention, a first hydraulic circuit is connected to the lubricant reservoir for directing pressurized lubricant to the lubricant receiving areas on the implement. A second hydraulic circuit directs lubricant from a lubricant supply to the lubricant reservoir. The pump assembly is commonly connected to the first and second hydraulic circuits for directing lubricant flow therethrough. Control of lubricant flow through the lubricant system is controlled by a two-position valve mechanism used to selectively connect an outlet end of the pump to either the first or second hydraulic circuits. In a first position, the valve mechanism directs lubricant flow to the lubricant receiving areas in response to pump operation. In a second position, the valve mechanism allows lubricant to flow from a lubricant supply to the lubricant reservoir in response to pump operation.

The first hydraulic circuit further includes a lubricant distribution system. The purpose of the lubricant distribution system is to deliver corresponding amounts of lubricant to corresponding lubricant receiving areas on the agricultural implement. A pressure relief valve is preferably connected to the pump outlet to protect the system from damaging high pressures.

In another form of the invention, the operation of the pump assembly can be reversed. To effect such ends, hydraulic circuitry is provided for controlling operation of the pump assembly. Such hydraulic circuitry includes a valve mechanism which in one position causes the pump assembly to be driven in one direction whereby pressurized lubricant is supplied to the lubricant receiving areas. In a second position, the valve mechanism selectively reverses operation of the pump assembly whereby lubricant is withdrawn from a lubricant supply source and is directed toward and refills the lubricant reservoir through use of the same pump being used to lubricate the lubricant receiving areas on the implement.

Either form of the invention relies on the ability to use a common pump assembly for directing lubricant in different directions and through a lubrication system for an agricultural implement. The use of a common pump for supplying pressurized lubricant to a multitude of lubricant receiving areas and which allows for refilling the lubricant reservoir is less costly than previous systems. The dual function of the pump assembly offers a relatively simple and inexpensive lubrication system which is both efficient and accurate in providing corresponding amounts of lubricant to corresponding lubricant receiving areas on an agricultural implement.

Numerous other features and advantages of the present invention will become readily apparent from the following detailed description, the accompanying drawings, and the appended claims.

BRIEF DESCRIPTION OF THE DRAWINGS

FIG. 2 is a schematic representation of one form of a lubrication system according to the present invention; and FIG. 3 is a schematic representation of a second embodiment of a lubrication system according to the present invention.

DESCRIPTION OF THE PRESENT INVENTION

Figure 1:
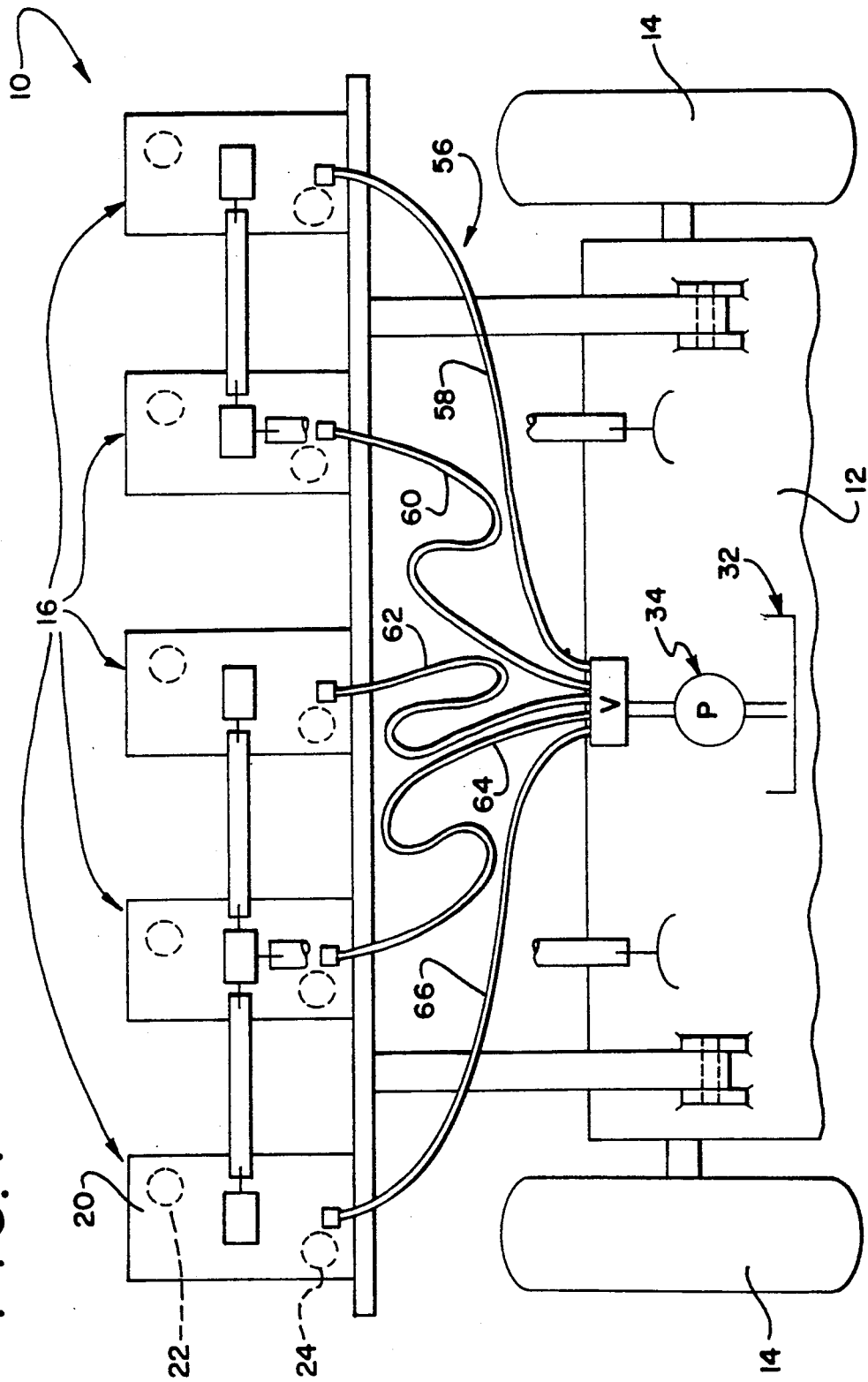
FIG. 1 is a fragmentary and schematic plan view of an agricultural implement embodying principles of the present invention.

While the present invention is susceptible of embodiment in various forms, there are shown in the drawings, and will hereinafter be described, two presently preferred embodiments of the invention with the understanding the present disclosure sets forth exemplifications of the invention which are not intended to limit the invention to the specific embodiments illustrated.

Referring now the drawings, wherein like reference numerals indicate like parts throughout the several views, there is shown an agricultural implement which is depicted only fragmentarily but is seen as represented in its entirety in FIG. 1 by reference numeral 10. The agricultural implement can include any of a myriad of designs which include lubricated operative mechanisms. A cotton harvester has been chosen for purpose of illustration but it should be appreciated that the present invention is equally applicable to any of a series of other applications.

As shown in FIG. 1, cotton harvester 10 has a fore-and-aft extending frame 12 mounted on ground engaging wheels 14. Positioned forwardly on the frame are a plurality of individually operable harvesting units 16. Each harvesting unit 16 includes a harvesting mechanism which removes cotton from a row of cotton plants and defines a series of lubricant receiving areas thereon. The cotton harvester is of conventional construction such as an 1800 series sold by Case International of Racine, Wisconsin, and therefore, will only be described in such detail as to describe and orientate the lubrication system, indicated generally at 30 in FIG. 2.

The harvesting units 16 are preferably arranged side-by-side laterally across a front end of the harvester and are of generally like construction. Each harvesting unit includes a housing assembly 20 which is designed to allow a plant row to pass therethrough. In a preferred form of the invention, the harvesting mechanism of each harvesting unit includes a pair of picker rotor assemblies 22 and 24 which are rotatably arranged within the housing assembly 20. As is conventional, each picker rotor assembly includes a plurality of lubricant receiving areas thereon. Accordingly, like harvesting units have like or corresponding lubricant receiving areas thereon.

As schematically shown in FIG. 2, the lubrication system 30 includes a lubricant reservoir 32 and a source of pressurized lubricant or pump assembly 34. As will be described in detail hereinafter, the pump assembly 34 serves a dual function. In one mode of operation, pump assembly 34 operates to supply pressurized lubricant to the lubricant receiving areas on each of the harvesting units 16. In a second mode of operation, pump assembly 34 operates to refill the lubricant reservoir 32.

Preferably, the pump assembly 34 includes a constant displacement gear pump 36 mounted on the harvester beneath the reservoir 32 and a hydraulic motor 38 for driving the pump 36. Pump 36 includes an input 40 connected to the lubricant reservoir 32 and an outlet 42 from which pressurized lubricant is exhausted.

The hydraulic motor 38 of the pump assembly 34 is connected and driven in response to hydraulic pressure derived from a hydraulic system 44 on the harvester. Hydraulic fluid passing through the hydraulic motor 38 is returned to a reservoir 46 via line 48 leading from the hydraulic motor. A solenoid actuated valve 50 selectively provides a source of power to operate the pump assembly 34.

As shown, valve 50 operates in response to output signals from a control system 52 which may be substantially similar to that disclosed in co-assigned J.I. U.S. Pat. Case Company No. 5,025,614. Suffice it to say, the control system 52 controls the valve 50 such that pump assembly 34 is preferably operated when the harvester is operated in a "Service" mode of operation.

The present invention further includes a lubricant distribution system 56 for delivering substantially corresponding amounts of lubricant to corresponding lubricant receiving areas on the harvesting units 16. As shown, the distribution system 56 is connected to the outlet 42 of pump 36 and includes a series of common lines 58, 60, 62, 64 and 66. The lines 58 through 66 are generally of the same length and cross-section so as to provide a substantially equal resistance to grease flow therethrough from line to line and so that as grease is supplied under pressure from the pump assembly, an equal amount of grease is distributed to each of the harvesting units 16.

The first embodiment of the lubrication system 30 of the present invention furthermore includes hydraulic circuitry for selectively directing lubricant from the reservoir 32 to the lubricant receiving areas on the implement or from a lubricant supply source 70 to the lubricant reservoir 32 in a manner refilling same. Preferably, such hydraulic circuitry includes a first hydraulic circuit including a feed line 74 for directing lubricant between the reservoir 32 and the inlet 40 to the pump assembly 34 and a feed line 76 for directing pressurized lubricant from the outlet 42 of pump 36 to the lubricant receiving areas on the harvesting units. Such hydraulic circuitry further includes a second hydraulic circuit including a feed line 79 for directing lubricant from the lubricant supply source 70 to the lubricant reservoir 32.

A valve mechanism including a pair of interconnected valves 80 and 82 are used for controlling lubricant flow through the lubrication system 30 by selectively connecting the outlet 42 of the pump 36 to either the first or second hydraulic circuits of the lubrication system. Each of the valves 80, 82 is configured as a three-way, two position valve.

As shown, when valve 80 is in a first position, the inlet 40 of pump 36 is connected to the lubricant reservoir 32. When valve 82 is in a first position, pressurized lubricant is directed to flow to the lubricant receiving areas of the harvesting units in response to pump operation. When valves 80 and 82 are each in a second position and pump 36 is operated, lubricant is withdrawn from supply source 70 and is directed to flow from the pump outlet 42 into feed line 79 of the second hydraulic circuit and across valve 80 to the lubricant reservoir 32.

In this first embodiment, a fill line 86 selectively connects the lubricant supply source 70 to the inlet 40 of pump 36. As shown, the fill line 86 is connected hydraulically between valve 80 and the pump inlet 40 as by means of a releasable connector 88 to feed line 74. The releasable connector 88 is located at a convenient location on the frame of the agricultural implement. As will be appreciated, the supply source 70 may be a supply barrel filled with lubricant.

A pressure relief valve 90 is also provided in the lubrication system 30 to inhibit damage resulting from lubricant pressures exceeding a predetermined level. As illustrated, the relief valve 90 is incorporated into the system downstream of the outlet 42 of pump assembly 34.

The lubrication system of the present invention further includes a connection 92 allowing for manual lubrication of the harvesting units 16. As shown, the connection 92 is provided downstream of valve 82 and is associated with the hydraulic circuitry leading to the harvesting units.

A second embodiment of the lubrication system is illustrated in FIG. 3. For purposes of clarity and succinctness, those elements which are similar in this embodiment to those which were previously described will be identified by like reference numerals.

As shown in FIG. 3, the second embodiment of the lubrication system includes a lubricant reservoir 32 mounted on the frame of the agricultural implement and a source of pressurized lubricant or pump assembly 134. As will be described in detail hereinafter, the pump assembly 134 serves a dual function. In one mode of operation, pump assembly 134 operates to supply pressurized lubricant to various lubrication receiving areas on the implement. In a second mode of operation, pump assembly 134 is operated to refill the lubricant reservoir 32 from a supply source 70.

The pump assembly 134 is reversible in operation and preferably includes a constant displacement gear pump 136 mounted on the harvester beneath the reservoir 32 and a reversible hydraulic motor 138 for driving the pump 136. Pump 136 includes an inlet 140 connected to the lubricant reservoir 32 and an outlet 142 from which pressurized lubricant is exhausted.

The hydraulic motor 138 of the pump assembly 134 is connected and driven in response to hydraulic pressure derived from the hydraulic system 44 on the implement. As in the first embodiment, hydraulic circuitry is provided for influencing operation of the hydraulic motor 138 and thereby controlling operation of the pump assembly 134. Such hydraulic circuitry includes a first hydraulic circuit for driving the hydraulic motor 138 in a first rotary direction and a second hydraulic circuit for reversing operation of the hydraulic motor and thereby the pump assembly 134. As in the first embodiment, a solenoid actuated valve 50 selectively provides a source of power to operate the pump assembly 134.

In the illustrated embodiment, a valve mechanism including a pair of interconnected valves 180 and 182 are used to selectively control operation of the hydraulic motor 138 and thereby pump operation. Each valve 180 and 182 is a two-position valve. The first hydraulic circuit includes a feed line 152 for directing pressurized hydraulic fluid from the hydraulic system on the implement to and across valve 180.

In a first position, valve 180 directs pressurized fluid from the hydraulic system to port 154 of motor 138 to drive the pump 136 in a first direction. In a first position, valve 182 directs fluid from port 156 of motor 138 over a fluid line 158 to reservoir 46.

When valve 180 is shifted to a second position, pressurized hydraulic fluid from the hydraulic system 44 of the implement is directed through the second hydraulic circuity including feed line 170. The fluid flowing from hydraulic system 44 and through feed line 170 is presented to port 156 of motor 138 thus causing the motor 138 to rotate in a second rotational direction and thereby reversing direction of the pump 136. Because valves 180 and 182 are interconnected, shifting of valve 180 will likewise cause valve 182 to shift to a second position. When valve 182 is in its second position, fluid exhausted from port 154 of motor 138 will be directed through feed line 172 included in the second hydraulic circuit. As shown, feed line 172 opens downstream of valve 182 to reservoir 46.

In this second embodiment, a fill line 186 selectively connects the lubricant supply source 70 to a feed line 187 used to connect outlet port 142 of pump 136 to the distribution system 56. A releasable connector 188 is located in a convenient location on the side of the agricultural implement to facilitate connecting the supply source 70 to the lubrication system of the present invention.

As will be appreciated, reversal of pump assembly 134 will draw lubricant from the supply source 70 through line 186 to refill the reservoir 32. The fill line 186 will preferably be configured such that upon reversal of pump assembly 134 lubricant will tend to be withdrawn from the lubricant supply 70 rather than from the lubricant distribution system 56

In a preferred form of the invention, a valve 189 will be provided downstream of the connection 188. The valve 189 will be interconnected to valves 180 and 182. Thus, when valves 180, 182 are shifted from a first to a second position, as discussed above, to effect reversal of the pump assembly 134, valve 189 will shift therewith from a normally open position allowing fluid communication between pump assembly 134 and the harvesting units to a closed position A pressure relief valve 190 is also provided in the second embodiment of the lubrication system to inhibit damage resulting from the pressurized lubricant going beyond the predetermined level As in the first embodiment, a connection 192 is provided for manual lubrication of the harvesting units 16. As shown, connection 192 is located downstream of valve 189 and is associated with the hydraulic circuitry leading to the harvesting units.

In either form of the invention, a simple and inexpensive assembly is provided for filling a chassis mounted lubricant reservoir on an agricultural implement. Advantageously, the lubricant reservoir 32 is refilled by reversing the output of the same pump assembly as used for normally transferring lubricant from the reservoir to various lubricant receiving areas on the implement As will be appreciated, using a common pump eliminates the need for a transfer pump to be located on the field service truck.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A lubrication system for an agricultural implement having a plurality of lubricant receiving areas from which lubricant is lost during operation of the implement, said lubrication system comprising:
   a lubricant reservoir located on the implement;
   a pump located on the implement for withdrawing lubricant from the reservoir and providing lubricant under pressure from an outlet end thereof; and
   hydraulic circuitry means for connecting an inlet of said pump to said reservoir and connecting the outlet end of the pump to each of said lubricant receiving areas, said hydraulic circuitry means including positionable means movable between a first position for selectively operating said pump such that lubricant is withdrawn from said reservoir and provided to said lubricant receiving areas and a second position for allowing lubricant to be withdrawn from a lubricant supply source selectively connectable to said lubrication system and be directed to said lubricant reservoir under the influence of pump operation and in a manner refilling the lubricant reservoir following connection of said lubricant source to said lubrication system.

2. The lubrication system according to claim 1 wherein said positionable means includes valve means for selectively controlling the direction of lubricant flow through said circuitry means.

3. A lubrication system for an implement having a plurality of lubricant receiving areas from which lubricant is lost during implement operation, said lubrication system comprising:
   a lubricant reservoir located on the implement;
   first hydraulic circuitry means connected to said reservoir for directing pressurized lubricant to the lubricant receiving areas on the implement;
   second hydraulic circuitry means for directing lubricant from a lubricant supply source to said lubricant reservoir following selective connection of said lubricant supply source to said lubrication system;
   a pump located on the implement and commonly connected to said first and second hydraulic circuitry means for directing lubricant flow therethrough; and
   valve means for controlling lubricant flow through said lubrication system by selectively connecting an outlet of said pump to either said first hydraulic circuitry means for replenishing lost lubricant to said lubrication receiving areas on the implement or the second hydraulic circuitry means for refilling the reservoir from the lubricant supply source following connection of the lubricant supply source to said lubrication system.

4. The lubrication system according to claim 3 wherein said valve means includes a pair of interconnected two-position valves, wherein when said valves are in a first position, lubricant flows to said lubricant receiving areas in response to operation of said pump, and wherein a second position of said valves allow lubricant to flow from said lubricant supply source to said lubricant reservoir in response to operation of said pump.

5. A lubrication system for an agricultural implement having a plurality of lubricant receiving areas from which lubricant is lost during implement operation, said lubrication system comprising:
   a lubricant reservoir located on the implement;
   a lubricant pump located on the implement and having an inlet connected to said lubricant reservoir and an outlet from which pressurized lubricant is exhausted;
   first hydraulic circuitry means connected to the pump outlet for directing pressurized lubricant to the lubricant receiving areas on the implement in response to operation of said pump;
   second hydraulic circuitry means connected to the pump outlet for directing lubricant from a lubricant supply source to said lubricant reservoir in response to operation of said pump and following selective connection of said supply source to said lubrication system; and
   valve means connected to said first and second hydraulic circuitry means for normally allowing lubricant exhausted from the pump outlet to be directed to said lubricant receiving areas thereby replenishing lost lubricant and being selectively operable to disconnect the pump outlet from said lubricant receiving areas and allow lubricant from said lubricant supply source to pass to said reservoir thereby refilling same through use of the pump commonly used to direct lubricant to the lubricant receiving areas.

6. The lubrication system according to claim 5 wherein said lubricant pump includes a gear pump driven by a hydraulic motor connected to a pressurized hydraulic system of the implement.

7. The lubrication system according to claim 5 wherein said first hydraulic circuitry means includes a lubricant distribution system for delivering corresponding amounts of lubricant to corresponding lubricant receiving areas.

8. The lubrication system according to claim 5 further including a pressure relief valve connected to the pump outlet.

9. A lubrication system for an agricultural implement having a plurality of lubricant receiving areas from which lubricant is lost during implement operation, said lubrication system comprising:
   a lubricant reservoir mounted on the implement;
   a lubricant pump for forcibly moving lubricant through said lubrication system, said pump having a first port connected to said lubricant reservoir and a second port opening to the lubricant receiving areas, said pump being located on the implement and driven by a hydraulic motor connected to a pressurized hydraulic system on the implement;
   connection means located between said pump and said lubricant receiving areas for allowing said lubricant supply source to be selectively connected to said lubrication system; and
   hydraulic means for controlling operation of said pump, said hydraulic means including selectively positionable valve means operable in one position to cause said pump to be driven in a direction whereby pressurized lubricant is supplied to said lubricant receiving areas, said valve means being operable in a second position to selectively reverse operation of said pump whereby lubricant is withdrawn from said lubricant supply source following connection of said supply source to said lubrication system to permit said lubricant reservoir to be refilled from said supply source through use of the same pump used to lubricate the lubricant receiving areas on the implement.

10. The lubrication system according to claim 9 wherein said hydraulic means further includes solenoid actuated valve means for selectively connecting said hydraulic motor to a hydraulic system on the agricultural implement.

* * * * *